United States Patent
White et al.

(10) Patent No.: US 10,054,398 B2
(45) Date of Patent: Aug. 21, 2018

(54) OPTICAL DEVICE KNOB HAVING VARIABLE RESISTANCE TO ROTATION

(71) Applicant: Burris Company, Greeley, CO (US)

(72) Inventors: Matthew Travis White, Fort Collins, CO (US); Steven A. Bennetts, Eaton, CO (US); Seth Alan Feinberg, Greeley, CO (US)

(73) Assignee: Burris Company, Inc., Greeley, CO (US)

( * ) Notice: Subject to any disclaimer, the term of this patent is extended or adjusted under 35 U.S.C. 154(b) by 107 days.

(21) Appl. No.: 15/342,030

(22) Filed: Nov. 2, 2016

(65) Prior Publication Data

US 2018/0120058 A1    May 3, 2018

(51) Int. Cl.
| | | |
|---|---|---|
| *F41G 1/38* | (2006.01) | |
| *G05G 5/00* | (2006.01) | |
| *G05G 1/10* | (2006.01) | |
| *F41G 3/00* | (2006.01) | |
| *G02B 23/16* | (2006.01) | |

(52) U.S. Cl.
CPC .................. *F41G 1/38* (2013.01); *F41G 3/00* (2013.01); *G02B 23/16* (2013.01); *G05G 1/10* (2013.01); *G05G 5/005* (2013.01)

(58) Field of Classification Search
CPC ........................................................ F41G 1/38
USPC ........................................ 33/1 N; 42/111, 119
See application file for complete search history.

(56) References Cited

U.S. PATENT DOCUMENTS

| | | | | |
|---|---|---|---|---|
| 9,423,215 | B2* | 8/2016 | White | F41G 3/08 |
| 2013/0276345 | A1* | 10/2013 | Hamilton | F41G 1/38 |
| | | | | 42/119 |
| 2013/0312310 | A1* | 11/2013 | Geller | F41G 1/38 |
| | | | | 42/122 |
| 2014/0000146 | A1* | 1/2014 | Davidson | F41G 1/38 |
| | | | | 42/122 |
| 2015/0316350 | A1* | 11/2015 | Hamilton | F41G 1/38 |
| | | | | 42/122 |
| 2016/0146576 | A1* | 5/2016 | White | F41G 1/38 |
| | | | | 42/119 |
| 2016/0370146 | A1* | 12/2016 | Hamilton | F41G 1/38 |
| 2017/0010068 | A1* | 1/2017 | White | F41G 1/38 |
| 2018/0023922 | A1* | 1/2018 | Walker | F41G 1/38 |

* cited by examiner

*Primary Examiner* — G. Bradley Bennett

(57) ABSTRACT

An optical device housing has a post rotatably extending therefrom and a sleeve fixedly extending therefrom. The sleeve is disposed around the post. A knob is connected to the post. A clutch mechanism includes: a friction element movably engaged with the sleeve; a friction surface; and an adjustment element engaged with the friction element and rotatable relative to the optical device housing and the knob housing. Rotation of the adjustment element selectively engages the friction surface with the interior surface.

20 Claims, 8 Drawing Sheets

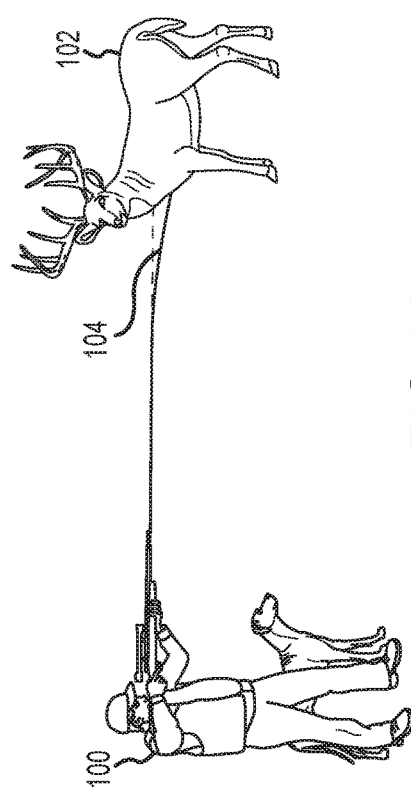
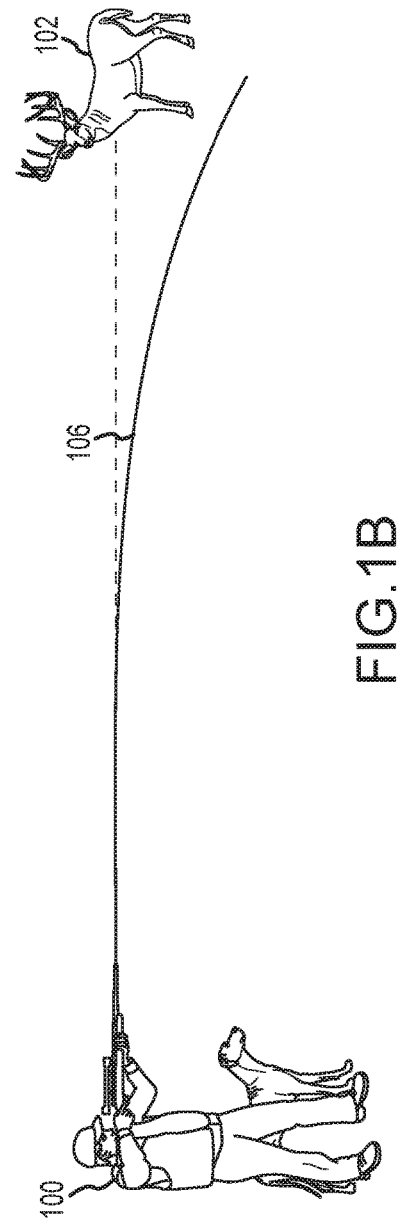
FIG.1A
FIG.1B

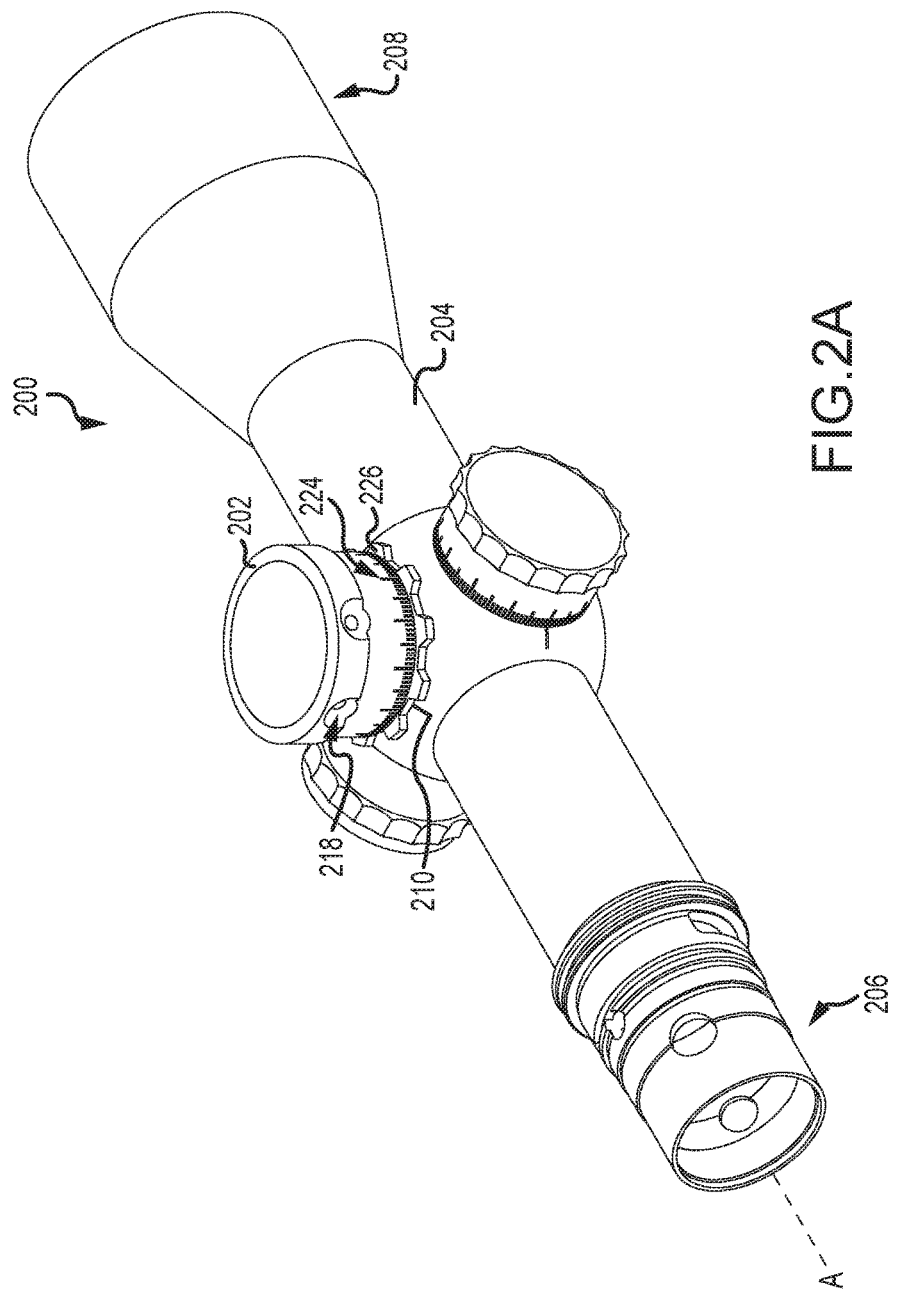

OPTICAL DEVICE KNOB HAVING VARIABLE RESISTANCE TO ROTATION

Aiming a rifle or gun requires the consideration of several environmental and other types of factors. When a bullet travels from a rifle to an intended target, several forces affect the flight of the bullet. Gravity causes the bullet to drop in elevation as the bullet travels from the firearm to the target. If a hunter 100 is close to his/her target 102, as shown in FIG. 1A, the bullet drops very little, represented by the trajectory 104. At greater distances, gravity causes a bullet to drop in elevation more significantly, as represented by the trajectory 106 in FIG. 1B. An optical device such as a riflescope is used to accurately aim the rifle.

SUMMARY

In one aspect, the technology relates to an apparatus having: an optical device housing; a post rotatably extending from the optical device housing; a sleeve fixedly extending from the optical device housing and disposed about the post; a knob connected to the post so as to be rotatable relative to the optical device housing, the knob having a knob housing having an interior surface; and a clutch mechanism having: a friction element movably engaged with the sleeve; a friction surface; and an adjustment element engaged with the friction element and rotatable relative to the optical device housing and the knob housing, wherein a rotation of the adjustment element selectively engages the friction surface with the interior surface. In an example, the post includes a post axis and wherein each of the post, the sleeve, the knob housing, the friction element, and the adjustment element are centered about the post axis. In another example, the sleeve includes a sleeve projection extending away from the post axis, and wherein the friction element is disposed about the sleeve and includes a friction element projection engaged with the sleeve projection, wherein an engagement between the sleeve projection and the friction element projection prevents rotation of the friction element relative to the sleeve. In yet another example, the friction element projection is slidable relative to the sleeve projection in a direction along the post axis. In still another example, the adjustment element includes a ramp engaged with the friction element, such that a rotation of the adjustment element moves the friction element along the post axis.

In another example of the above aspect, the ramp is engaged with a surface of the friction element disposed substantially opposite the friction surface. In an example, the ramp is engaged with a surface of the friction element disposed substantially opposite the friction element projection. In another example, the friction surface is discrete from the friction element.

In another aspect, the technology relates to an apparatus including: an optical device housing; a post rotatably extending from the optical device housing; a sleeve fixedly extending from the optical device housing and disposed about the post, wherein the post and sleeve are centered on a common axis; a knob connected to the post so as to be rotatable relative to the optical device housing; a friction element non-rotatably engaged with the sleeve and slidably engaged with the sleeve so as to slide along the sleeve relative to the common axis; and a position adjustment element engaged with the friction element, wherein a rotation in a first direction of the position adjustment element selectively increases a frictional resistance between the knob and the friction element. In an example, a rotation in a second direction of the position adjustment element selectively decreases the frictional resistance between the knob and the friction element. In another example, the rotation in the second direction entirely disengages the friction element from the knob. In yet another example, the position adjustment element extends beyond an outer surface of the knob. In still another example, the friction element is substantially ring-shaped and is disposed around the sleeve.

In another example of the above aspect, the position adjustment element is substantially ring-shaped and is disposed around the friction element. In an example, the position adjustment element is substantially ring-shaped and is disposed opposite the friction element from the knob. In another example, each of the knob, the post, the sleeve, the friction element, and the position adjustment element are centered on the common axis.

In another aspect, the technology relates to an apparatus having: an optical device housing; a post rotatable about an axis extending from the optical device housing; a sleeve fixedly extending from the optical device housing and disposed about the post, wherein the post and sleeve are centered on an axis; a knob connected to the post so as to be rotatable relative to the optical device housing; a clutch disposed about the sleeve; and a cam engaged with the clutch, wherein a rotation of the cam moves the clutch into engagement with the knob. In an example, in a first cam position, the clutch is disengaged from the knob. In an example, in a second cam position, the clutch engages the knob at a first frictional resistance. In another example, in a third cam position, the clutch engages the knob at a second frictional resistance greater than the first frictional resistance.

BRIEF DESCRIPTION OF THE DRAWINGS

There are shown in the drawings, embodiments which are presently preferred, it being understood, however, that the technology is not limited to the precise arrangements and instrumentalities shown.

FIGS. 1A-1B depict simplified representations of the effect of gravity on the flight of a bullet.

FIG. 2A depicts a partial perspective view of an optical device.

DETAILED DESCRIPTION

The present technology relates to new and improved embodiments of known sighting systems and methods (such as those described in U.S. Pat. No. 7,703,679, the disclosure of which is hereby incorporated by reference herein in its entirety), for correctly aiming a firearm or other implement. As used herein, a "sighting system" shall be construed broadly and is defined as one or more optical devices and processing systems that assist a person in aiming a projectile launch system, such as a firearm, a rifle, a handgun, or other implement. The disclosed technology has application in any type of sighting system or optical device, including those with addressable aiming elements and those without. In this application, a riflescope will be described as an exemplary embodiment.

Figure 2B:
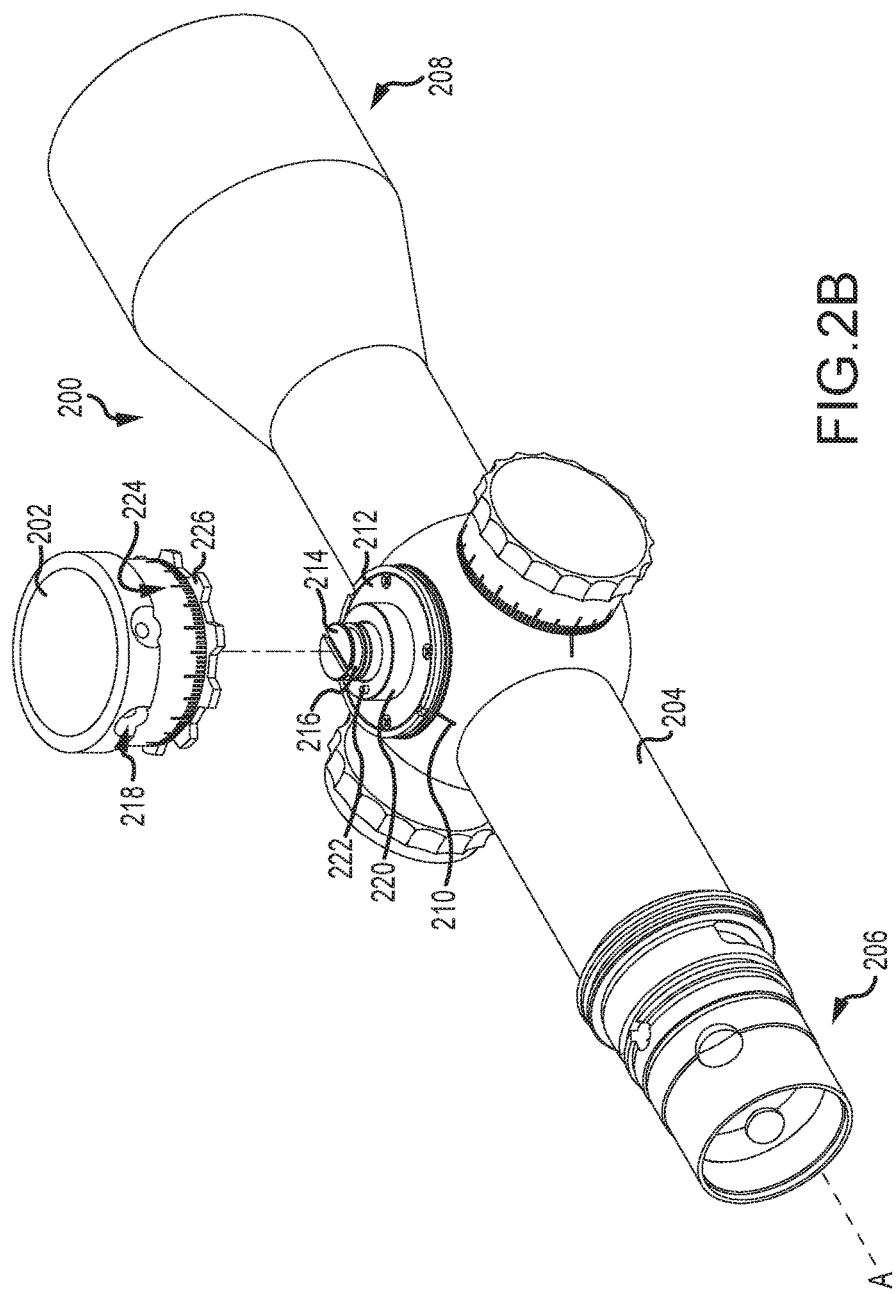
FIG. 2B depicts a partial exploded perspective view of an optical device.

A hunter, sniper, or other person using a rifle or other firearm, commonly referred to as a shooter, uses optical sighting systems, such as riflescopes, to visually acquire a target and improve aiming accuracy. FIGS. 2A and 2B depict partial perspective and partial exploded perspective views of an optical device 200 in the form of a riflescope. These two figures are described concurrently. The optical device 200 utilizes an adjustment knob 202 that is used to adjust one or more settings of the optical device. The optical device 200 includes a housing 204 having a longitudinal axis A, as well as an ocular end 206 and an objective end 208 (an ocular bell housing and lenses are not depicted in FIGS. 2A and 2B). A reference mark 210 is disposed on a surface of the housing 204, proximate a knob mount 212. The knob mount 212 is secured to the housing 204 and defines a location upon which the knob 202 rests when attached to an adjustment post 214. The adjustment post 214 includes a neck 216 sized so as to receive a plurality of set screws (not shown) disposed in openings 218 defined by the knob 202. The adjustment post 214 is rotatably mounted relative to the housing 204. Once the knob 202 is secured to the adjustment post 214, rotation of the knob 202 rotates the adjustment post 214, so as to adjust a sighting system disposed in the housing 204 (e.g., moving lenses or reticles, or changing other optical settings of the sighting system, as known in the art).

The knob mount 212 may include a sleeve 220 that is fixedly secured relative to the housing 204 (e.g., via the knob mount 212), so as not to rotate relative thereto. A clocking pin 222 extends from the sleeve 220 and is fixed so as not to move upon rotation of the knob 202. The clocking pin 222 prevents overrotation of the knob 202. The knob 202 includes a plurality of reference markings 224, typically in the form of tick marks or lines disposed about an outer circumference of the knob 202. Rotation of the knob 202 aligns different reference markings 224 with the reference mark 210 on the housing 204, thus providing a visual indication to the shooter of a setting of the optical device 200. Once a desired position of the knob 202 (relative to the housing 204) is set, it may be desirable for the shooter to set this position of the knob 202, so as to avoid inadvertent rotation thereof. Such an inadvertent rotation, if unnoticed, may change a setting of the optical device 200, potentially causing an inaccurate later shot by the associated rifle.

Accordingly, the optical devices described herein utilize knobs that are configured to variably resist rotation by utilizing structure that selectively increases and decreases the frictional resistance of the knob. This can reduce or prevent the likelihood of rotation of the knob. Additionally, the frictional resistance may be varied so the knobs may be turned easily or with difficulty, as required or desired by a particular shooter. For example, when zeroing the knob (e.g., after a successful shot), a shooter may want little to no additional resistance applied to the knob so as to enable a faster rotation. When precise rotation of the knob is required, the shooter may set the frictional resistance of the knob to a desired setting, so as to prevent, e.g., inadvertent overrotation thereof. When a desired position is attained, the frictional resistance may be further increased so as to set the knob against inadvertent rotation in the desired position. The variable friction knobs described herein, however, need not wholly prevent rotation once set. So-called "locking knobs" available in the prior art often include elements that physically engage in such a way that a high force applied to the knob can break the locking mechanism, causing damage to the knob that requires repair or replacement. The variable friction knobs described herein, however, resist rotation applied up to a certain force. Higher forces, however, will cause rotation of the knob, without damage to the mechanism that resists rotation. As such, the variable friction knobs are more versatile and less prone to damage than many prior art locking knobs.

Relative to FIGS. 2A and 2B, then, the optical device includes a friction adjustment element 226, here in the form of a crenellated ring disposed proximate the knob 202. The knob 202 is independently rotatable relative to the friction adjustment element 226. Similarly, the friction adjustment element 226 is independently rotatable relative to both the knob 202 and the housing 204, whereby rotation of the adjustment element 226 to adjust the frictional resistance of the knob 202 does not rotate the knob 202. Additionally, when a desired position of the knob 202 is attained, the adjustment element 226 may be rotated to set a friction level sufficient to maintain that position, again without rotation of the knob 202 itself. In FIGS. 2A and 2B, only a single knob 202 of multiple knobs on the optical device 200 is depicted as including a friction adjustment element 226. Any number of knobs on a given optical device may incorporate the technologies described herein.

Figure 3:
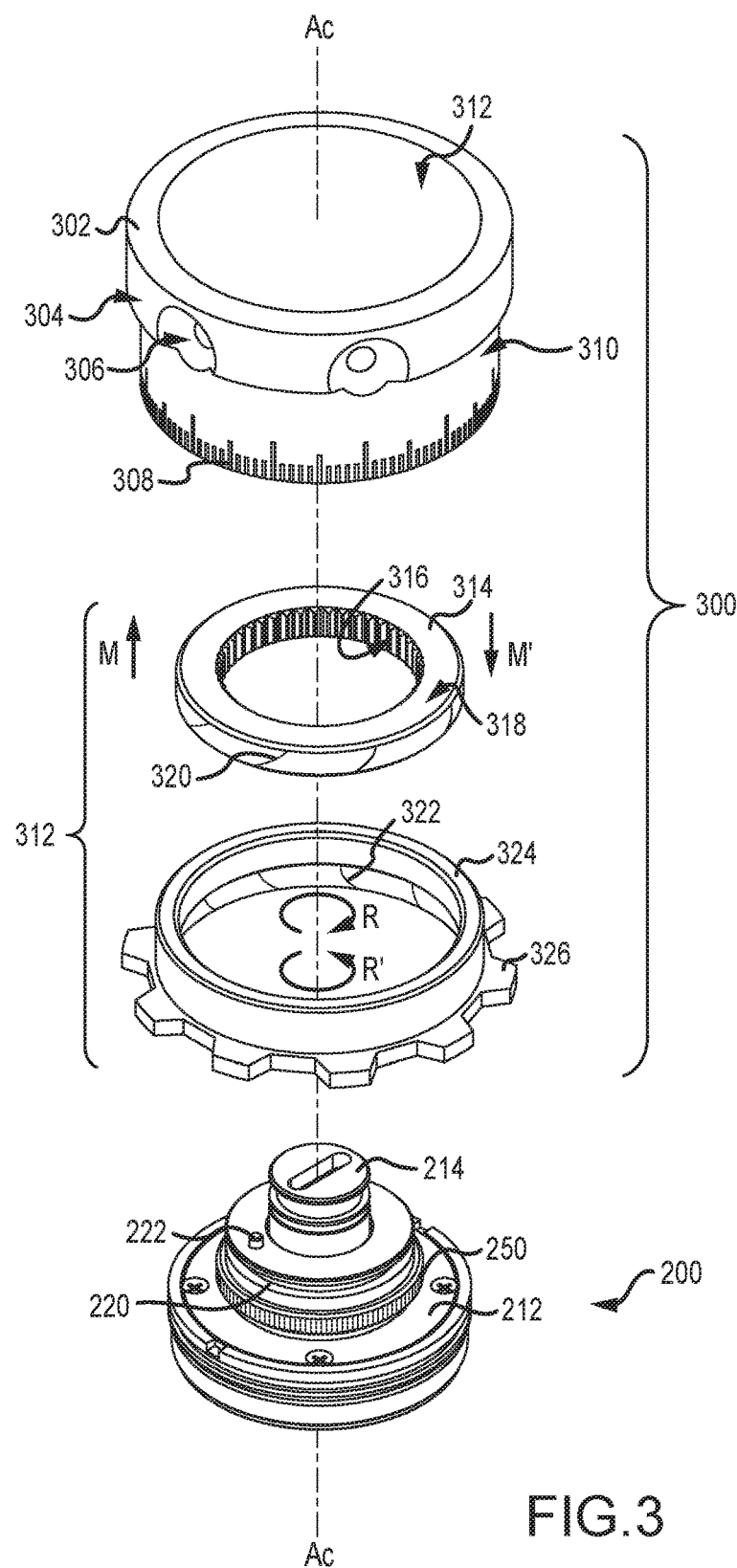
FIG. 3 depicts an exploded perspective view of a variable friction knob for an optical device.

FIG. 3 depicts an exploded perspective view of a variable friction knob 300. Also depicted, for context, is a portion of an optical device 200, notably, a fixed knob mount 212 and components extending therefrom. More specifically, a sleeve 220 and a clocking pin 222 fixedly extend from the knob mount 212. A post 214 rotatably extends from the sleeve 220. The sleeve 220 also includes one or more sleeve projections 250 about an outer circumference thereof. In the depicted example, a plurality of sleeve projections 250 are in the form of a plurality of teeth extending away from a common central axis $A_C$, which is defined by the post 214 and about which the post 214 rotates.

The variable friction knob 300 includes a knob housing 302 that has a gripping portion 304, which may be knurled or otherwise textured to provide a secure gripping surface. As described above, the knob 302 also defines a plurality of openings 306 for receiving set screws (not shown). Reference markings 308 are also depicted on the exterior surface 310 of the housing 302. The reference markings 308 may additionally include alphanumeric indicia or other symbols. In another example, the knob 300 may incorporate the multi-turn knob technologies described in U.S. Pat. No. 9,423,215, the disclosure of which is hereby incorporated by reference herein in its entirety. A top surface 312 of the knob housing 302 seals the knob 300 against intrusion of dirt, debris, rainwater, or other containments that may be found in the field.

The variable friction knob 300 also includes a clutch mechanism 312 that may be utilized to vary the amount of frictional resistance to rotation of the knob housing 302, certain benefits and advantages of which are described above. The clutch mechanism 312 includes a clutch or friction element 314, which in the depicted example is substantially ring-shaped and has an inner surface defining one or more toothed projections 316. The toothed projections 316 are configured to engage with the plurality of sleeve projections 250, thus preventing the friction element 314 from rotating about axis $A_C$. The mating projections 316, 250 are configured so as to allow the friction element 314 to slide relative to the sleeve 220 along and substantially parallel to the axis $A_C$, as described below. The friction element 314 includes a friction surface 318, which in the depicted example is a substantially flat upper surface, although other configurations are contemplated and described herein. For example, the friction element 314 can be a high strength material, such as metal, topped with a high friction material. The high friction material may define the friction surface 318 and be discrete from or adhered to (or even integral with) the friction element 314. Additional coatings or textures may be applied to or formed on the friction surface 318 as required or desired to further increase the coefficient of friction thereof.

The friction element 314 also includes one or more threads, cams, or ramps 320 disposed on an outer surface thereof. The ramps 320 are configured to engage with matching threads, cams, or ramps 322 disposed on an interior surface of an adjustment element 324. The adjustment element 324 may also be substantially ring-shaped and disposed about the friction element 314. As such, a first directional rotation R of the adjustment element 324 produces a first linear movement M of the friction element 314, while a second opposite directional rotation R' produces a second linear movement M' of the friction element 314. These rotations R, R' and corresponding movements M, M' adjust the frictional resistance of the knob 300, as described in more detail below. To rotate R, R' the adjustment element 324, a shooter applies a force to one or more of the crenellations 326 that project from a side of the adjustment element 324. These crenellations 326 project beyond the exterior surface 310 of the knob housing 302 to enable easy access and rotation R, R'.

The position of the friction element 314, relative to the knob housing 302, as described in further detail below, determines the frictional resistance of the knob 300 to rotation. When the friction element 314 is not in contact with the knob housing 302, no additional frictional resistance is applied to the knob 300. As the friction element 314 first contacts the knob housing 302, then applies a greater force thereto, the resistance to rotation of the knob 300 increases. In order to balance the various forces, the various components of the knob 300 are arranged so as to be substantially centered about the common axis $A_C$ that extends from the post 214. More specifically, the post 214 rotates about the common axis $A_C$, while the sleeve 220 is disposed about the post 214 and is fixedly secured to the knob mount 212 so as to not rotate about the axis $A_C$. The friction element 314 is disposed about the sleeve 220 and engaged therewith so as to not rotate about the axis $A_C$. The adjustment element 324 is disposed about the friction element 314. A portion of the knob housing 302 is disposed about the adjustment element 324, while leaving the crenellations 326 exposed. The centers of all of these elements are aligned along the common axis $A_C$.

Figure 4:
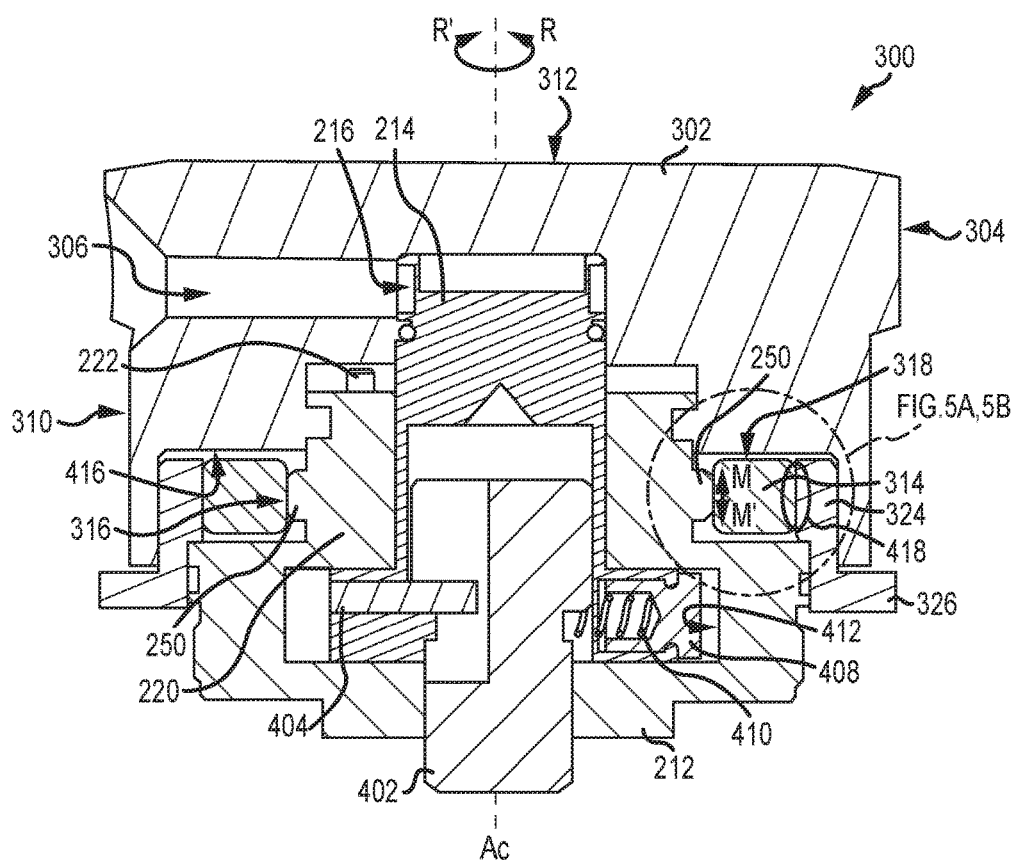
FIG. 4 depicts a sectional view of a variable friction knob for an optical device.

FIG. 4 depicts a sectional view of a variable friction knob 300, such as that depicted in FIG. 3. A number of the components depicted in FIG. 4 are described above in preceding figures, and are therefore not necessarily described further. The knob mount 212 is secured to the housing of an optical device (not shown) so as not to rotate. An extension element 402 penetrates the knob mount 212 and extends into the optical device housing. Movement thereof (either rotational or linear movement, as required or desired for a particular application), adjusts an optical setting of the optical device. In the depicted example, a set pin 404 extends from the post 214 into the extension 402, such that rotation of the post 214 is transferred to the extension 402, thus causing a corresponding rotation thereof. A clicker 408 is biased away from the axis $A_C$ by a spring 410 and into a detent surface 412 (contact between the clicker 408 and detent surface 412 is not depicted in FIG. 4 for clarity). The clicker 408 and detent surface 412 aids in setting a position of the knob housing 302 such that the reference markings (not depicted) on the exterior surface 310 thereof align with the reference mark (not depicted) on the optical device housing.

The post 214 extends upwards from within sleeve 220 and is configured to rotate relative thereto, about the common axis $A_C$. The knob housing 302 is secured to the post 214 via a set screw (not depicted) inserted into the opening 306 so as to engage the neck 216 in the post 214. Multiple set screws may be utilized. As described above, the sleeve 220 includes one or more sleeve projections 250 that extend away from the common axis $A_C$. The sleeve projection 250 engages with a mating projection 316, e.g., a toothed projection, extending from an inner surface of the friction element 314. Note that in FIG. 4, the sleeve projection 250 is depicted as extending into the friction element 314, in a position proximate where the mating projection 316 is located. The mating projection 316 is not depicted, for clarity. The adjustment element 324 is configured to rotate independent of knob housing 302 and the post 214, so as to enable adjustment of the frictional resistance to rotation of the knob housing 302. In FIG. 4, the friction element 314 is not in contact with the knob housing 302. More specifically, the friction surface 318 is not engaged with an interior engagement surface 416 of the knob housing 302. As such, there is a no additional frictional resistance applied to the knob housing 302 by the friction element 314 and the knob housing 302 is easiest to rotate. As the adjustment member 324 is rotated R about the axis $A_C$, the interface 418 (in FIG. 4, the threaded or ramped structure of the interface 418 is not depicted, for clarity) between the adjustment member 324 and the friction element 314 causes the friction element 314 to move M upward, substantially along and parallel to the common axis $A_C$. This movement allows the shooter to selectively engage the friction surface 318 with the interior engagement surface 416, thus increasing the frictional resistance to rotation of the knob 302. Further rotation R of the adjustment element 324 increases the frictional resistance. As described above, however, since the friction surface 318 and interior engagement surface 416 are generally flat surfaces and do not utilize engaging parts such as detents, locking projections, and the like, sufficient rotational force may still overcome the set frictional resistance. As such, the knob 300 resists rotation that may occur inadvertently due to incidental contact (e.g., during movement of the rifle in the field), but will not be damaged if a significant rotational force is applied to the knob housing 302. When a shooter wishes to reduce the frictional resistance, the adjustment element 324 is rotated R' in an opposite direction so as to move M' the friction element 314 downward.

Figure 5A:
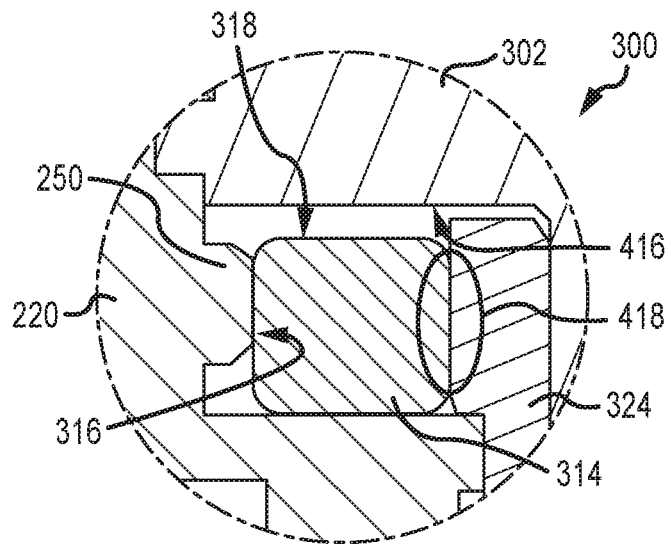
FIGS. 5A-5B depict enlarged partial section views of the variable friction knob of FIG. 4.
Figure 5B:
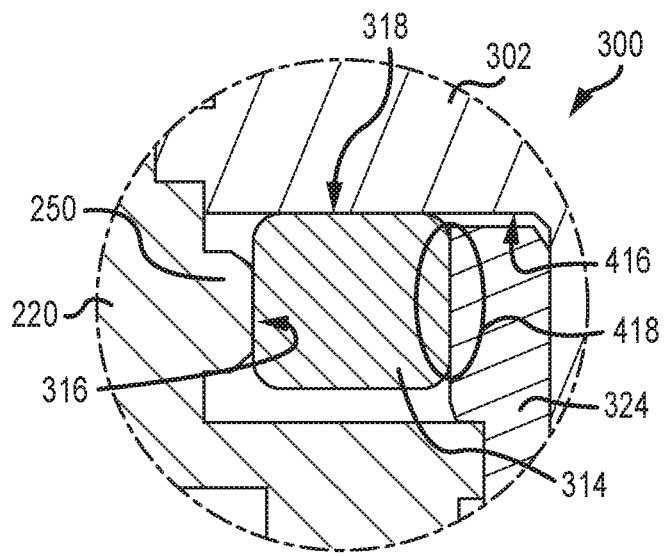

FIGS. 5A-5B depict enlarged partial section views of the variable friction knob 300 of FIG. 4. A number of the components depicted in FIGS. 5A and 5B are described above in preceding figures, and are therefore not necessarily described further. FIG. 5A depicts the friction element 314 in a position so as to exert no additional frictional resistance against the interior surface 416 of the knob housing 302. Thus, the knob 300 is free to turn. As depicted in FIG. 5B, since the adjustment element 324 has been rotated, the engagement of the friction element 314 and the adjustment element 324 at the interface 418 caused an upward movement of the friction element 314. Once the friction surface 318 contacts the interior surface 416 of the knob housing 302, the frictional resistance between the friction element 314 and the interior surface 416 increases. Thus, since the friction element 314 is non-rotatably engaged with the sleeve 220 at the projections 316, 250, resistance to rotation of the knob housing 302 increases. The adjustment element 324 may be further rotated so as to apply a greater force by friction element 314 to the interior surface 416, this increasing the frictional resistance of the knob housing 302 to rotation. This increase in frictional resistance may be accompanied with compression of the friction element 314 against the interior surface 416.

Figure 6A:
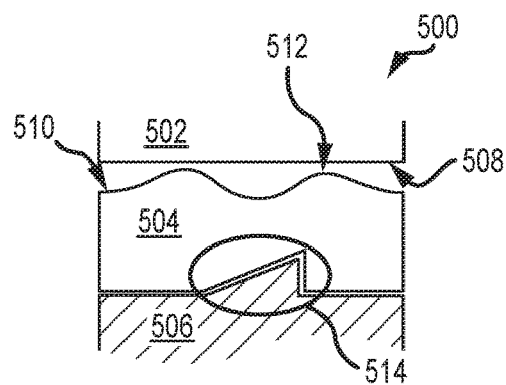
FIG. 6A-6C depict partial side sectional views of another example of a variable friction knob for an optical device.
Figure 6B:
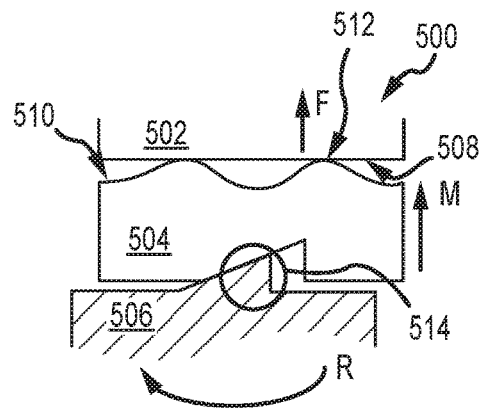
Figure 6C:
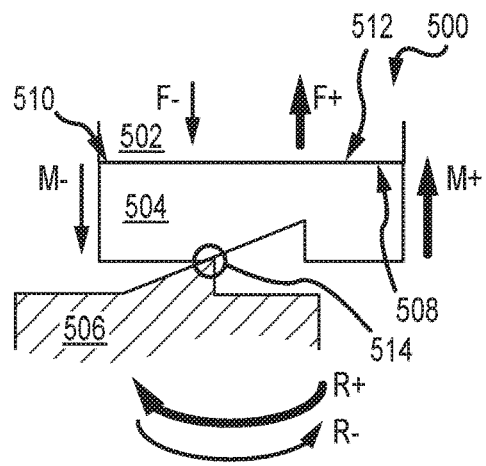

FIG. 6A-6C depict partial side sectional views of a variable friction knob 500, which includes, schematically depicted, a knob housing 502, a clutch or friction element 504, and an adjustment element 506. The knob housing 502 has an interior surface 508 and the friction element has a friction surface 510 including a number of wave-like projections 512. Projections having other shapes are contemplated. For example, such projections may be discrete bumps or domes projecting from the friction surface 510, or may be toothed or crenellated projections. The friction element 504 and the adjustment element 506 are engaged at a cammed or ramped interface 514 disposed on a surface of the friction element 504 opposite the friction surface 510. In FIG. 6A, the friction element 504 is not engaged with the knob housing 502. As such, the friction element 504 applies no frictional resistance to the knob housing 502. In FIG. 6B, the adjustment element 506 has been rotated R, which moves M the friction element 504 upward, due to the engagement between those elements at the ramped interface 514. This upward movement would be substantially parallel to the common axis depicted previously. This causes contact between the wave-like projections 512 of the friction surface 510 and the interior surface 508, thus applying a force F to the knob housing 502 and increasing the frictional resistance to rotation of the knob 500. In FIG. 6C, the adjustment element 506 has been further rotated R+, which further moves M+ the friction element 504 upward. This causes compression of the wave-like projections 512 and increases the contact area between the friction surface 510 and the interior surface 508, thus applying a greater force F+ to the knob housing 502, further increasing the frictional resistance to rotation of the knob 500. Rotation R− in the opposite direction (also depicted in FIG. 6C), moves M− the friction element 504 in an opposite direction, reducing the force F− applied to the knob housing 502. This decreases the frictional resistance to rotation of the knob 500. Further opposite rotation R− of the adjustment element 506 returns the friction element 504 to the non-contacting condition depicted in FIG. 6A, where the friction element 504 is entirely disengaged from the knob housing 502.

Figure 7A:
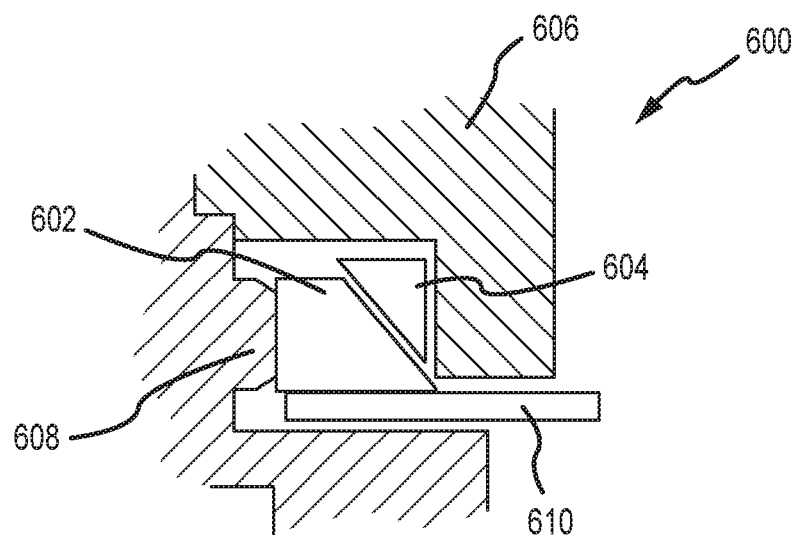
FIGS. 7A-7B depict enlarged partial section views of another example of a variable friction knob for an optical device.
Figure 7B:
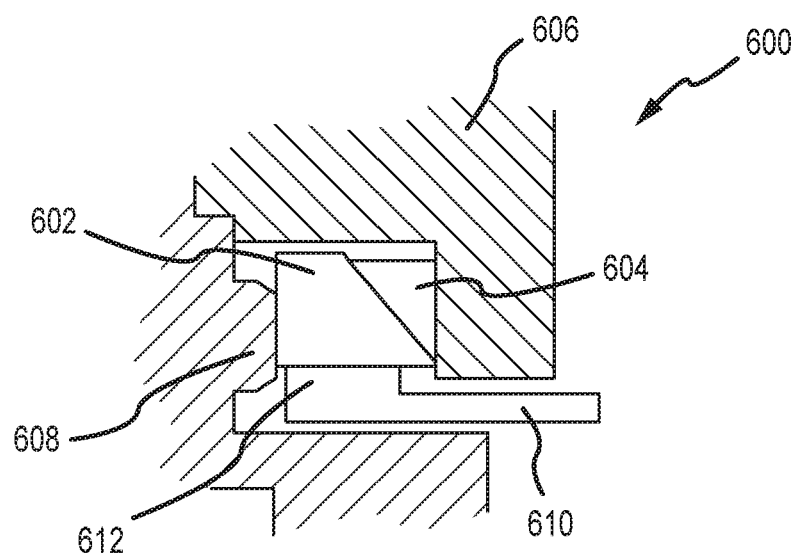

FIGS. 7A-7B depict enlarged partial section views of another example of a variable friction knob 600 for an optical device. Specifically, FIGS. 7A-7B depict a variable friction knob 600 that utilize a friction element 602 that lacks an integral friction surface. Instead, the friction surface is in the form of a discrete (relative to the friction element 602) friction ring 604 that may be connected to the housing 606, or discrete therefrom, as depicted. The friction element 602 is slidably engaged with a sleeve 608, as described above. Additionally, an adjustment element 610 is disposed in this case below the friction element 602. FIG. 5A depicts the friction element 602 in a position so as to exert no additional frictional resistance against the knob housing 606, since it is not engaged with the friction ring 604. Thus, the knob 600 is free to turn. As depicted in FIG. 5B, since the adjustment element 610 has been rotated, a ramp 612 thereon pushes the friction element 602 upward, along the sleeve 608. The wedge-shaped configuration of the friction element 602 applies a force (e.g., an outward force) to the friction ring 604, pushing that element out into contact with the housing 606, thereby adjusting the frictional resistance to rotation of the knob 600. The adjustment element 610 may be further rotated so as to apply a greater force by friction element 602 to the friction ring 604, this increasing the frictional resistance of the knob housing 606 to rotation. This increase in frictional resistance may be accompanied with compression of the friction ring 604 against the housing 606.

The materials utilized in the manufacture of the variable friction knobs depicted therein are similar to those typically used in manufacture of knobs for optical devices. For example, the knob housings and other components may be aluminum or other robust metals and may be powder coated or otherwise treated to resist corrosion. The adjustment element may be low-friction material such as PVC, ABS, nylon, or other plastics. Additionally, metals may be used and may be coated with Teflon or other low-friction coatings at the interface between the adjustment element and friction element to ensure smooth movement of the interface therebetween. The friction element may include higher friction materials such as dry rubber, foam rubber, silicone, or sintered metal. In other examples, the friction element may be manufactured of a low friction material and may have an upper friction surface manufactured of a different, higher friction material, or may be textured or treated to display a higher coefficient of friction.

While there have been described herein what are to be considered exemplary and preferred embodiments of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. An apparatus comprising:
    an optical device housing;
    a post rotatably extending from the optical device housing;
    a sleeve fixedly extending from the optical device housing and disposed about the post;
    a knob connected to the post so as to be rotatable relative to the optical device housing, the knob comprising a knob housing comprising an interior surface; and
    a clutch mechanism comprising:
        a friction element movably engaged with the sleeve;
        a friction surface; and
        an adjustment element engaged with the friction element and rotatable relative to the optical device housing and the knob housing, wherein a rotation of the adjustment element selectively engages the friction surface with the interior surface.

2. The apparatus of claim 1, wherein the post comprises a post axis and wherein each of the post, the sleeve, the knob housing, the friction element, and the adjustment element are centered about the post axis.

3. The apparatus of claim 2, wherein the sleeve comprises a sleeve projection extending away from the post axis, and wherein the friction element is disposed about the sleeve and comprises a friction element projection engaged with the sleeve projection, wherein an engagement between the sleeve projection and the friction element projection prevents rotation of the friction element relative to the sleeve.

4. The apparatus of claim 3, wherein the friction element projection is slidable relative to the sleeve projection in a direction along the post axis.

5. The apparatus of claim 3, wherein the adjustment element comprises a ramp engaged with the friction element, such that a rotation of the adjustment element moves the friction element along the post axis.

6. The apparatus of claim 5, wherein the ramp is engaged with a surface of the friction element disposed substantially opposite the friction surface.

7. The apparatus of claim 5, wherein the ramp is engaged with a surface of the friction element disposed substantially opposite the friction element projection.

8. The apparatus of claim 1, wherein the friction surface is discrete from the friction element.

9. An apparatus comprising:
an optical device housing;
a post rotatably extending from the optical device housing;
a sleeve fixedly extending from the optical device housing and disposed about the post, wherein the post and sleeve are centered on a common axis;
a knob connected to the post so as to be rotatable relative to the optical device housing;
a friction element non-rotatably engaged with the sleeve and slidably engaged with the sleeve so as to slide along the sleeve relative to the common axis; and
a position adjustment element engaged with the friction element, wherein a rotation in a first direction of the position adjustment element selectively increases a frictional resistance between the knob and the friction element.

10. The apparatus of claim 9, wherein a rotation in a second direction of the position adjustment element selectively decreases the frictional resistance between the knob and the friction element.

11. The apparatus of claim 10, wherein the rotation in the second direction entirely disengages the friction element from the knob.

12. The apparatus of claim 9, wherein the position adjustment element extends beyond an outer surface of the knob.

13. The apparatus of claim 9, wherein the friction element is substantially ring-shaped and is disposed around the sleeve.

14. The apparatus of claim 9, wherein the position adjustment element is substantially ring-shaped and is disposed around the friction element.

15. The apparatus of claim 9, wherein the position adjustment element is substantially ring-shaped and is disposed opposite the friction element from the knob.

16. The apparatus of claim 9, wherein each of the knob, the post, the sleeve, the friction element, and the position adjustment element are centered on the common axis.

17. An apparatus comprising:
an optical device housing;
a post rotatable about an axis extending from the optical device housing;
a sleeve fixedly extending from the optical device housing and disposed about the post, wherein the post and sleeve are centered on an axis;
a knob connected to the post so as to be rotatable relative to the optical device housing;
a clutch disposed about the sleeve; and
a cam engaged with the clutch, wherein a rotation of the cam moves the clutch into engagement with the knob.

18. The apparatus of claim 17, wherein in a first cam position, the clutch is disengaged from the knob.

19. The apparatus of claim 18, wherein in a second cam position, the clutch engages the knob at a first frictional resistance.

20. The apparatus of claim 19, wherein in a third cam position, the clutch engages the knob at a second frictional resistance greater than the first frictional resistance.

* * * * *